(12) United States Patent
Kamen (10) Patent No.: US 8,856,834 B2
(45) Date of Patent: *Oct. 7, 2014

(54) METHOD AND SYSTEM FOR REPLACING/OBSCURING TITLES AND DESCRIPTIONS OF RECORDED CONTENT

(75) Inventor: Yakov Kamen, Cupertino, CA (US)

(73) Assignee: JLB Ventures, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,496

(22) Filed: Apr. 30, 2012

(65) Prior Publication Data

US 2012/0216223 A1 Aug. 23, 2012

Related U.S. Application Data (63) Continuation of application No. 10/177,502, filed on Jun. 19, 2002, now Pat. No. 8,191,092.

(60) Provisional application No. 60/299,523, filed on Jun. 19, 2001, provisional application No. 60/299,533, filed on Jun. 19, 2001.

(51) Int. Cl.
| | |
|---|---|
| *G06F 3/00* | (2006.01) |
| *H04N 21/433* | (2011.01) |
| *G11B 27/10* | (2006.01) |
| *G11B 27/34* | (2006.01) |
| *H04N 21/454* | (2011.01) |
| *H04N 5/76* | (2006.01) |
| *H04N 21/4147* | (2011.01) |
| *H04N 5/781* | (2006.01) |
| *H04N 5/907* | (2006.01) |
| *H04N 9/804* | (2006.01) |
| *H04N 5/85* | (2006.01) |
| *H04N 5/765* | (2006.01) |
| *H04N 21/488* | (2011.01) |

(52) U.S. Cl.
CPC ....... *H04N 21/4147* (2013.01); *H04N 21/4332* (2013.01); *G11B 27/107* (2013.01); *H04N 5/781* (2013.01); *H04N 5/907* (2013.01); *H04N 9/8042* (2013.01); *H04N 5/85* (2013.01); *G11B 27/34* (2013.01); *H04N 21/4542* (2013.01); *H04N 5/76* (2013.01); *H04N 5/765* (2013.01); *H04N 21/4884* (2013.01); *G11B 27/105* (2013.01)
USPC .............................................. 725/47; 725/39

(58) Field of Classification Search
None
See application file for complete search history.

(56) References Cited

U.S. PATENT DOCUMENTS

| 665,869 A | 1/1901 | Brisco |
| 5,526,034 A | 6/1996 | Hoarty et al. |

(Continued)

OTHER PUBLICATIONS

Non-Final Office Action dated Jan. 3, 2013, in U.S. Appl. No. 13/091,035.

(Continued)

*Primary Examiner* — Brian T Pendleton
*Assistant Examiner* — Jean D Saint Cyr
(74) *Attorney, Agent, or Firm* — Banner & Witcoff, Ltd.

(57) ABSTRACT

A method and system for displaying titles of recorded content based on a user's access level. In one embodiment, a plurality of user identifications is received. Each of the user identifications may be associated with one of a plurality of access levels. Login information corresponding to a user may be received and a user interface may be generated. The user interface may display one or more titles corresponding to recorded content. The one or more titles displayed on the user interface may be based on an access level associated with the user.

19 Claims, 10 Drawing Sheets

| ORIG. TITLE | NEW TITLE | ORIG. DESCRIPTION | NEW DESCRIPTION |
|---|---|---|---|
| PEARL HARBOR | | ---------- | ---------- |
| SHREK | | ---------- | ---------- |
| HOT NIGHTS IN BANGKOK | THAILAND | ---------- | ---------- |

350

(56) References Cited

U.S. PATENT DOCUMENTS

| | | | |
|---|---|---|---|
| 5,550,578 A | 8/1996 | Hoarty et al. | |
| 5,619,247 A | 4/1997 | Russo | |
| 5,818,449 A | 10/1998 | Myers | |
| 5,973,683 A | 10/1999 | Cragun et al. | |
| 6,034,678 A | 3/2000 | Hoarty et al. | |
| 6,100,883 A | 8/2000 | Hoarty | |
| 6,163,272 A | 12/2000 | Goode et al. | |
| 6,169,543 B1 * | 1/2001 | Wehmeyer | 725/47 |
| 6,172,674 B1 | 1/2001 | Etheredge | |
| 6,177,931 B1 | 1/2001 | Alexander et al. | |
| 6,205,582 B1 | 3/2001 | Hoarty | |
| 6,321,381 B1 | 11/2001 | Yuen et al. | |
| 6,430,360 B1 | 8/2002 | Oh et al. | |
| 6,473,559 B1 | 10/2002 | Knudson et al. | |
| 6,481,009 B1 | 11/2002 | Miyakoshi | |
| 6,510,458 B1 | 1/2003 | Berstis et al. | |
| 6,556,219 B1 | 4/2003 | Wugofski | |
| 6,611,812 B2 | 8/2003 | Hurtado et al. | |
| 6,698,019 B1 | 2/2004 | Kim et al. | |
| 6,725,380 B1 | 4/2004 | Forlenza et al. | |
| 6,732,367 B1 * | 5/2004 | Ellis et al. | 725/27 |
| 6,757,871 B1 * | 6/2004 | Sato et al. | 715/236 |
| 6,771,317 B2 | 8/2004 | Ellis et al. | |
| 6,772,433 B1 | 8/2004 | LaJoie et al. | |
| 6,774,926 B1 | 8/2004 | Ellis et al. | |
| 6,785,901 B1 | 8/2004 | Horiwitz et al. | |
| 6,789,106 B2 | 9/2004 | Eyer et al. | |
| 6,816,904 B1 * | 11/2004 | Ludwig et al. | 709/226 |
| 6,922,843 B1 * | 7/2005 | Herrington et al. | 725/30 |
| 7,322,038 B2 | 1/2008 | Knudson et al. | |
| 7,690,012 B2 | 3/2010 | Luehrs | |
| 8,095,949 B1 * | 1/2012 | Hendricks et al. | 725/29 |
| 2001/0029511 A1 | 10/2001 | Burda et al. | |
| 2002/0162103 A1 | 10/2002 | Boudreault et al. | |
| 2003/0188313 A1 | 10/2003 | Ellis et al. | |
| 2004/0019903 A1 | 1/2004 | Knudson et al. | |
| 2004/0049787 A1 | 3/2004 | Maissel et al. | |
| 2004/0123135 A1 | 6/2004 | Goddard | |
| 2005/0125822 A1 | 6/2005 | Casement et al. | |
| 2009/0019485 A1 | 1/2009 | Ellis et al. | |

OTHER PUBLICATIONS

Notice of Allowance dated Aug. 5, 2013 in U.S. Appl. No. 13/091,035.

* cited by examiner

| TITLE | PROTECTED | PASSWORD |
|---|---|---|
| PEARL HARBOR | NO | |
| SHREK | NO | |
| HOT NIGHTS IN BANGKOK | YES | AAAABBBB |

*FIG. 5*

| UID | USERNAME | PIN/PASSWORD | ACCESS LEVELS |
|---|---|---|---|
| 1 | DAD | AAAABBBB | 1, 2, 3, 4, 5 |
| 2 | MOM | AAAABBBB | 1, 2, 3, 5 |
| 3 | JOHN(21) | AAAABBBB | 1, 2, 3, 4 |
| 4 | KATIE(17) | AAAABBBB | 2, 3 |
| 5 | ALEX(13) | AAAABBBB | 3 |
| 6 | JENNY(10) | AAAABBBB | |

| ACCESS LEVEL | UID |
|---|---|
| 1 | 1, 2, 3 |
| 2 | 1, 2, 3, 4 |
| 3 | 1, 2, 3, 4, 5 |
| 4 | 1, 3 |
| 5 | 1, 2 |

| TITLE | ACCESS_LEVEL |
|---|---|
| PEARL HARBOR | 3 |
| SHREK | |
| HOT NIGHTS IN BANGKOK | 5 |

| TITLE | DESCRIPTION | PASSWORD | ACCESS_LEVEL |
|---|---|---|---|
| PEARL HARBOR | ------ | | 3 |
| SHREK | ------ | | |
| THAILAND | ------ | AAAABBBB | 5 |

| ORIG. TITLE | NEW TITLE | ORIG. DESCRIPTION | NEW DESCRIPTION |
|---|---|---|---|
| PEARL HARBOR | | ------ | ------ |
| SHREK | | ------ | ------ |
| HOT NIGHTS IN BANGKOK | THAILAND | ------ | ------ |

| TITLE | HIDE TITLE | HIDE DESCRIPTION | PASSWORD | ACCESS_LEVEL |
|---|---|---|---|---|
| PEARL HARBOR | NO | NO | | 3 |
| SHREK | NO | NO | | |
| HOT NIGHTS IN BANGKOK | YES | YES | AAAAABBBB | 5 |

METHOD AND SYSTEM FOR REPLACING/OBSCURING TITLES AND DESCRIPTIONS OF RECORDED CONTENT

CROSS-REFERENCE TO RELATED APPLICATIONS

The present application is a continuation of U.S. patent application Ser. No. 10/177,502, filed on Jun. 19, 2002, which claims benefit to provisional applications entitled "METHOD OF SELECTING INDIVIDUAL TITLES OF RECORDED VIDEO PROGRAMS FOR VIEWING ACCESS CONTROL," Ser. No. 60/299,523, and "REPLACEABLE TITLE AND DESCRIPTION ON LISTING OF RECORDED SHOWS," Ser. No. 60/299,533, both filed on Jun. 19, 2001. These applications are incorporated by reference herein in their entirety.

TECHNICAL FIELD

The field of invention relates generally to video recording equipment and systems and, more specifically but not exclusively relates to personal video recorders and the like.

BACKGROUND

With the progress of personal video recorder (PVR) or digital video recorder (DVR) functionality, new problems arise pertaining to access control, such as, for example, parental control of movies available to children for viewing. Very often such functionality is integrated into the television electronic program guide (EPG) as a channel or similar selection category.

In current art, the various tools currently available for control of viewing access allow authorized users to lock a channel or selection category as an entire unit, without discrimination of programming offered on that channel. However, sometimes a parent wants to record shows suitable for their children, but at other times may want to record shows for themselves that they feel are not suitable for their children.

What is clearly needed is a system and a method of permitting users to control access to TV PVR or DVR functionality, such as recording and viewing movies, on a case-by-case basis, rather than completely turning on or turning off access to the whole functionality.

SUMMARY

In accordance with aspects of the present invention, a method and system for replacing and obscuring titles and/or descriptions pertaining to individual pieces of recorded content is disclosed. In one embodiment, the method enables a user, such as a parent, to rename titles and replace descriptions for selected pieces of content, thereby obscuring the content information for those pieces of content from other users, such as children. In another embodiment, the method enables an administrative user to define allowed access levels and assign the same to various users of the system. For example, a parent may define and assign allowed access levels to other family members, such as children, wherein each child could be assigned a unique set of allowed access levels. The administrative user is also enabled to assign access levels to individual pieces of content. In response to a user selection to view content information pertaining to recorded content, the system identifies the user and determines whether to display an original title/description or a new title/description based on the allowed access levels assigned to the user and the respective access levels assigned to the pieces of content. In yet another embodiment, titles and descriptions may be hidden from selected users.

According to other aspects of the invention, the method may be implemented via software running on the system, which will typically comprise a set-top box or the like. In particular, the set-top box will generally include functionality common to PRVs and DRVs, and the software may be employed in an electronic program guide and/or a recording application running on the set-top box.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of method and apparatus for controlling viewing to video content on an individual title (i.e. case-by-case) basis are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

PVRs and DVRs enable users to record and playback video content in a manner that is much more flexible than that available with older technologies, such as VCRs. Rather than storing video and audio content on a tape, PVRs and DVRs store such content on a digital medium that may be randomly accessed, such as a magnetic or optical disk (e.g., hard disk or the like). In addition, PVRs and DVRs include built-in processors that enable sophisticated recording options, such as real-time pausing and catch-up. As used herein, PVRs and DVRs fall under the general category of "set-top boxes," although it is acknowledged that many set-top boxes do not provide the recording and playback features of PRVs and DVRs.

Generally, PVRs and DVRs provide a set of user-interface screens that enable a user to interact with the system. For example, user-interface screens corresponding to an electronic program guide (EPG) apprise users of upcoming programming, and enable users to select content to be recorded on the device. Many times, the EPG is integrated into a recording application that is used for selecting content to be recorded, and for enabling users to view previously-recorded content. In some cases, the recording application will enable respective users to set up individual directories, accounts, or the like, in which information pertaining to each user is stored. However, even in cases where individual users have separate directories, or accounts, only each user's entire directory may be locked or unlocked.

Figure 1:
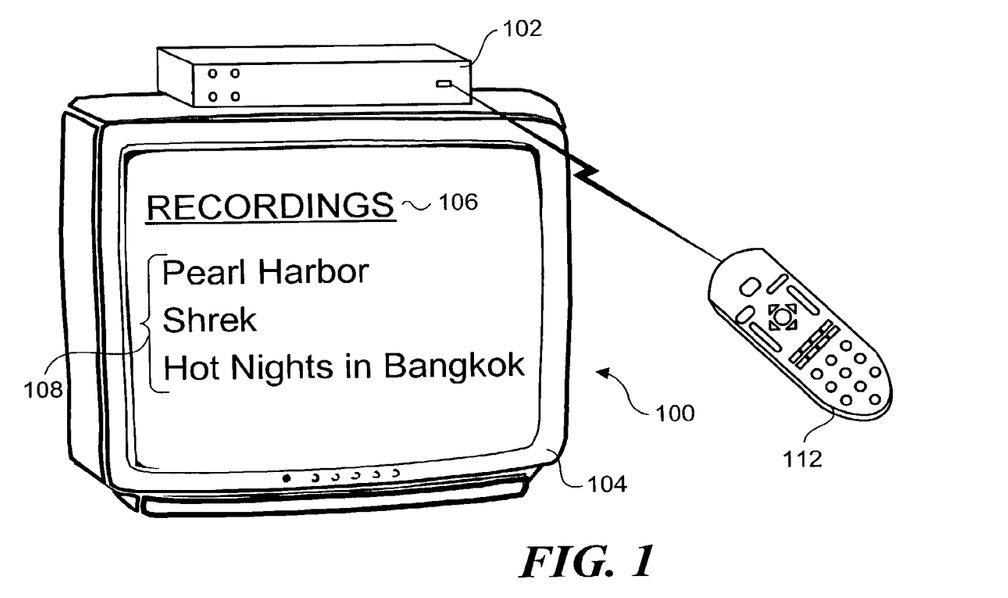
FIG. 1 is a representation of a display window corresponding to an initial recording condition.

FIG. 1 shows a window 100 generated by a recording application running on a PVR or DVR 102, as displayed on a TV screen 104. Window 100 corresponds to a situation after a user has selected the recording state. Typically, the window will display a title, such as "Recording," "My Shows," "Now Showing," or similar. In some cases, where multiple users of the recording application may each have their own directory, the window name may be personalized, such as "Margaret's Shows"; however, for simplicity of illustration, this example shows no personalized directory, but rather only a general directory title 106, "Recording." A list 108 of movies in the directory is also displayed, containing three titles: Pearl Harbor, Shrek, and Hot Nights in Bangkok.

Figure 2:
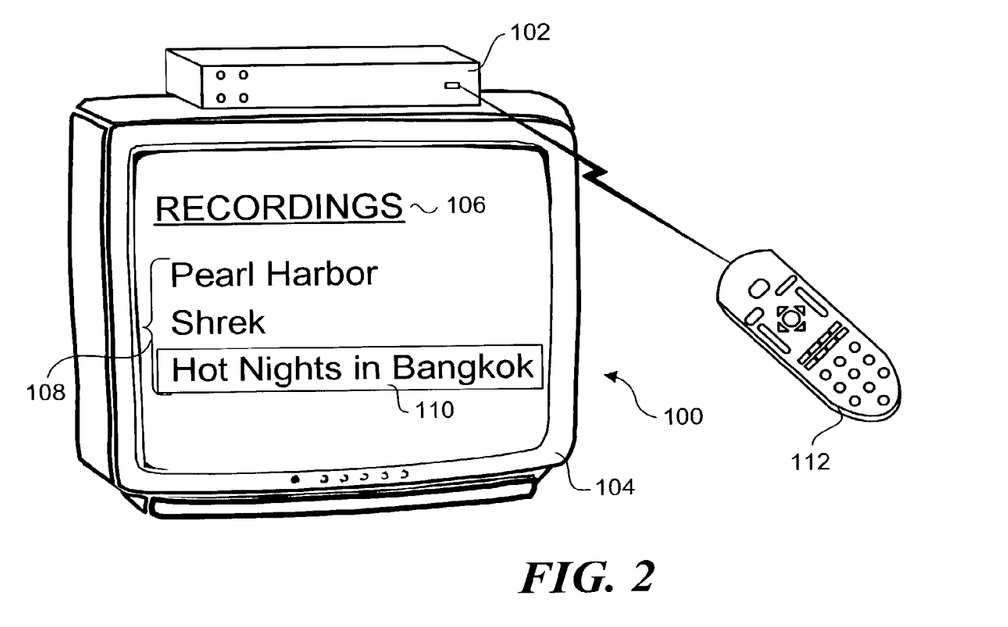
FIG. 2 is a representation of the display window of FIG. 1 upon selection of an individual title corresponding to video content for which control access is to be applied.

In some cases, a parent may not want a child to be able to watch a particular movie. In accordance with one embodiment of the invention, FIG. 2 illustrates how a user could select such a movie, even before recording it, while it's in the list of programs to be recorded, by moving a selector 120 (in this example, a highlight bar) to select that movie. Typically, such a selector will be controlled via a remote control 112, remote keyboard, or the like.

Figure 3:
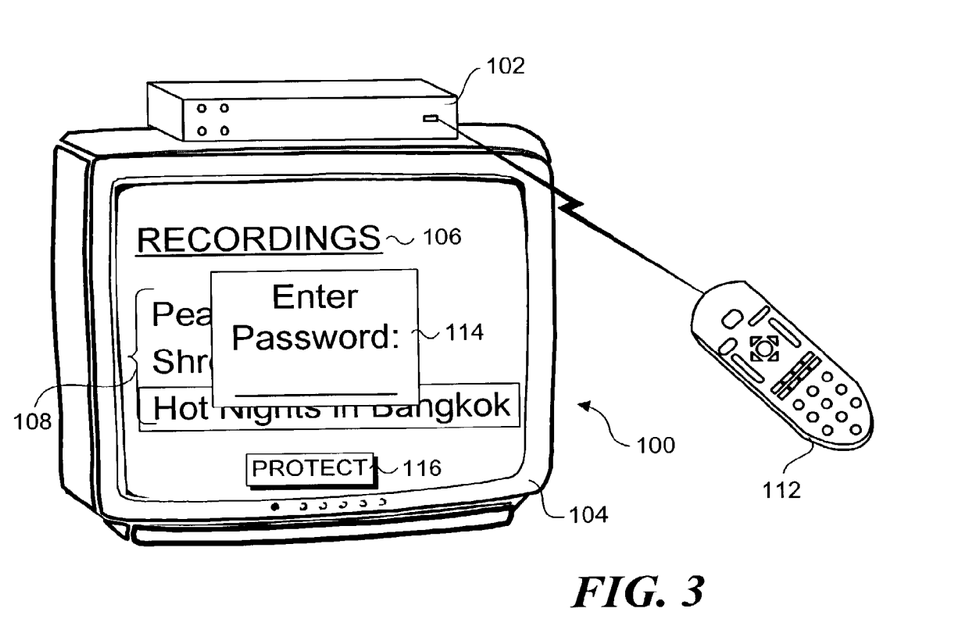
FIG. 3 is a representation of a display window that includes a password entry box in which a user enters a password to protect access to the individual title selected in FIG. 2.

In accordance with one embodiment, individual titles may be accessed by means of a password-based control mechanism. For example, in response to a user input after selecting the title, a password entry box 114 will be displayed in window 100, as shown in FIG. 3. For example, password entry box 114 may be invoked by a pre-configured (hard) button on remote control 112 or may be selected by a soft (i.e., programmable) button on the remote control or via a selectable button 116 in window 100. As illustrated, the user is prompted to enter a password in password entry box 114 to enter a password to gain access to proceed with any operation, whether recording or viewing, or any other operation on the selected title.

In accordance with this example embodiment, a similar password entry box would be displayed on a user interface window whenever a user, such as a child, would try watch a movie for which password access-control was previously defined. Unless the child enters the correct password, the movie is blocked and the child cannot watch it.

Figure 4:
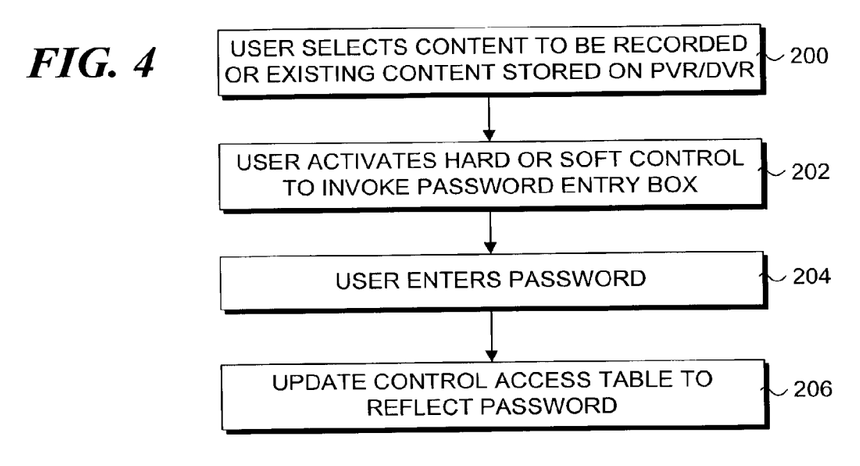
FIG. 4 is a flowchart illustrating logic and operations performed during a password-based control access process in accordance with one embodiment of the invention.

A flowchart corresponding to the definition portion of a password-based control access scheme in accordance with one embodiment is shown in FIG. 4. The process begins in a block 200 in which the user selects the content to be recorded, or existing content that has previously been recorded and is stored on the PVR or DVR. Typically, the content may be selected via its title, or similar indicia identifying the content. After selecting the content, the user will activate a user input control (e.g., hard or soft remote control button or display window button) to invoke password entry box 114, as provided by a block 202. The user will then enter a password in accordance with block 204. In response to entry of the password, the system will update a control access table to reflect the password in a block 206.

Figure 5:
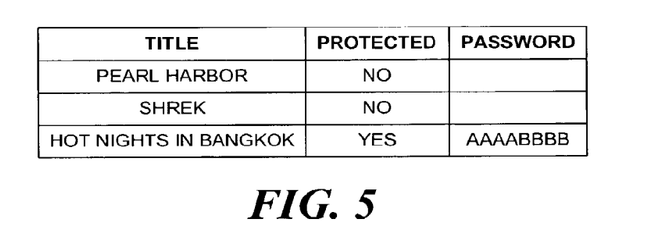
FIG. 5 shows an exemplary table in which password-based access information may be stored.

One embodiment of a control access table 300 is shown in FIG. 5. This table includes a TITLE column, a PROTECTED column, and a PASSWORD column. Upon assigning a password for a given title, the values in the PROTECTED and PASSWORD columns corresponding to the row for the title would be updated. In another embodiment, the PROTECTED column is dropped—in this instance, the existence of a password value indicates a title is protected. In addition to the illustrated embodiment, the control access values corresponding to control access table 300 but may be stored in an existing table that is modified to include such information. For example, appropriate columns could be added to an existing table that holds data pertaining to recorded content. Similar values could be stored in a "to be recorded" table.

Figure 6:
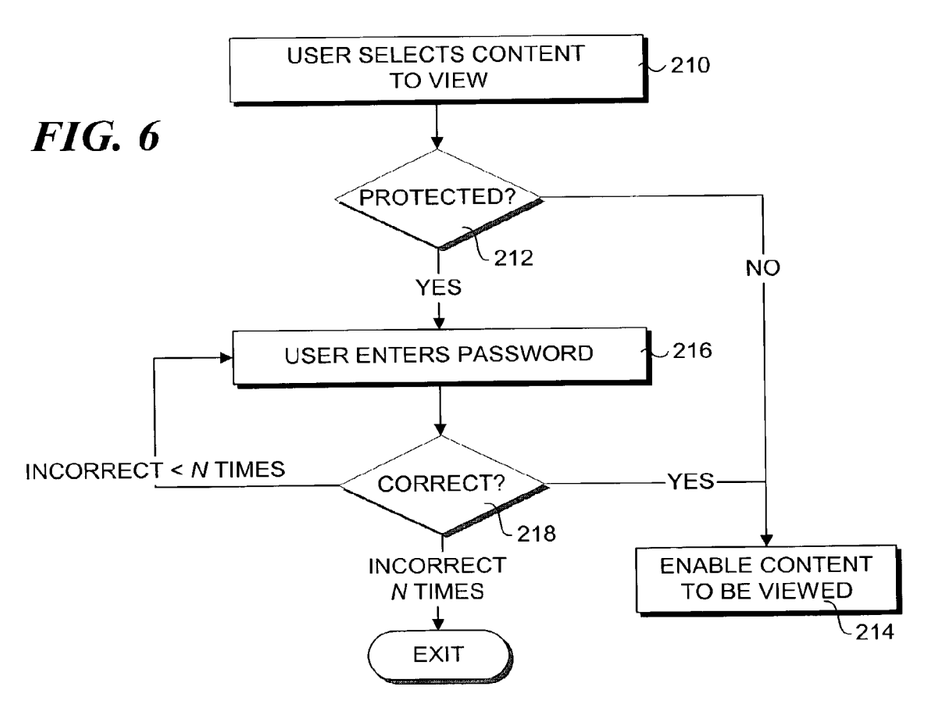
FIG. 6 is a flowchart illustrating logic and operations performed in response to a user attempting to access content that is password protected in accordance with one embodiment of the invention.

A flowchart corresponding to a typical user access scenario corresponding to a user attempting to view content for which a password has been defined is shown in FIG. 6. In a block 210 the user selects content to view. In response to the selection, a determination is made in a decision block 212 to whether the content is protected (i.e., a control access password has been defined for the content). If the content is not protected, the user is enabled to immediately view the content, as provided by a block 214. If the content is protected, the answer to decision block 212 is YES, and the logic proceeds to a block 216 corresponding to a password entry by the user. For example, upon selecting the title the user would be presented with a password entry box similar to password entry box 114.

In response to receiving the user's password, the system will determine if the entered password matches the stored password corresponding to the title, as depicted by a decision block 218. If the password matches, the user is enabled to view the content. If not, the user is denied from viewing the content. In one embodiment, the user is allowed to try password entry N times before the system bumps the user out. In this instance, the user would be presented with a cleared password entry box after each errant password entry is entered, preferably with accompanying indicia indicating that the previous password was incorrect.

In some instances, user may prefer not to use passwords, or will decide to use the same password in all cases. In the latter situation, it may be likely that the user will tell the password to others that should be allowed to view the password-protected content. Conceivably, there might be several passwords that are used for the users of a particular PVR, such as a family. In view of this consideration, one embodiment of the invention provides a mechanism that enables access levels to be assigned to individual titles, whereby users may only access those titles if they have been provided with access rights corresponding to the access levels.

Figure 7:
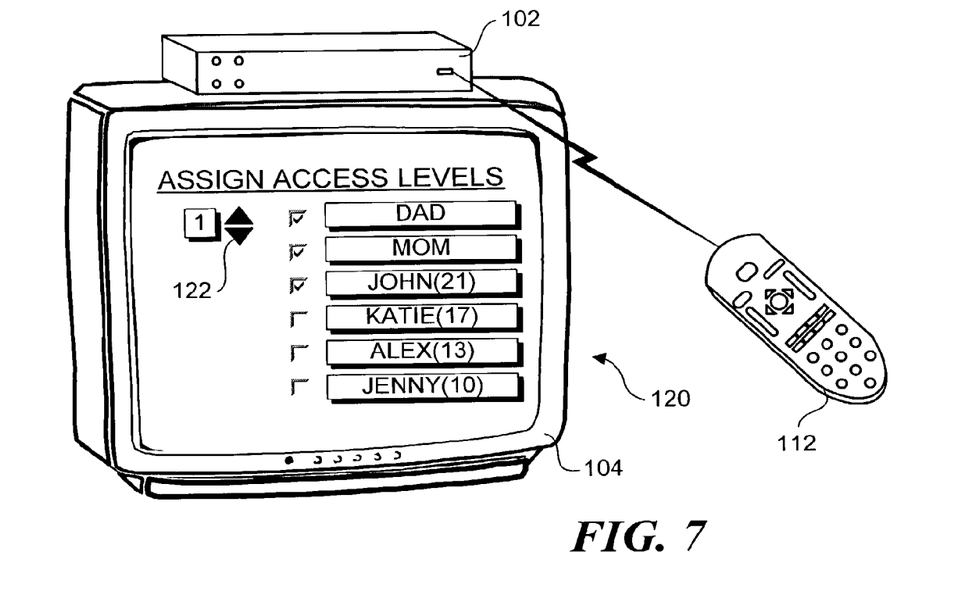
FIG. 7 is a representation of a screen that enables a user to assign access rights to users on an access-level basis.

In order to implement this scheme, access rights need to be defined for each user. Generally, this will be performed by an administrator, such as a parent. Typically, the system will enable an administrator to be defined during system setup operations. The administrator will be identified by his or her username, and will usually be authenticated via a password or personal identification number (PIN). In such a system, each user will also be identified by a username and/or password/PIN. Using administrator-accessible menu options, the administrator will be able to navigate to an access-level assignment screen 120, as shown in FIG. 7. In this illustrated embodiment, a list of users appears on the right-hand portion of the screen, wherein the names in the list correspond to previously-entered usernames for users who are allowed to use the PVR/DVR. For example, the depicted list includes a Father (Dad) and Mother (Mom), and their children; for illustrative purposes, the age of each child is included in parenthesis following that child's name. Assignment of the users for each access level may be defined by simply selecting the access level via up/down toggles 122 and selecting the appropriate checkboxes next to those user's usernames.

Figure 8:
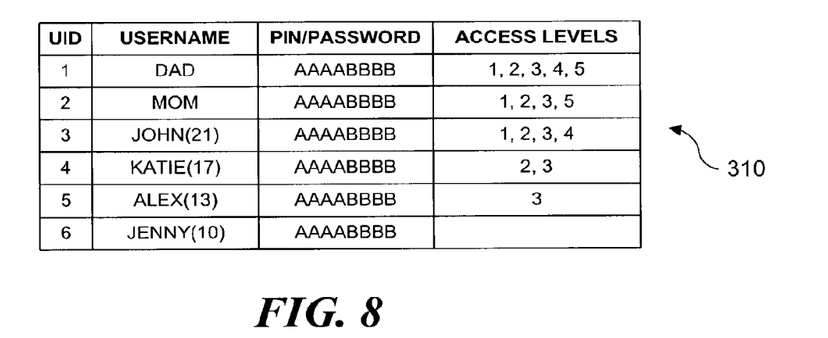
FIG. 8 show an exemplary table in which access level information may be stored.
Figure 9:
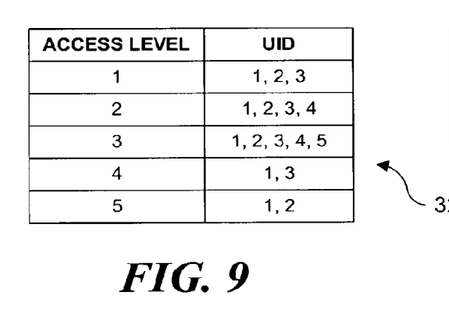
FIG. 9 shows another exemplary table in which access level information may be stored, wherein the tables in FIGS. 8 and 9 may be used together.

In response to entering the assess-level definitions, corresponding data is added to or modified in a user-access table 310 and or an access-level table 320 shown in FIGS. 8 and 9, respectively. Generally, the user-access table will include a USERNAME column in which usernames are stored and an ACCESS_LEVEL column in which access levels are stored. For illustrative purposes, the access level(s) for each user is/are depicted as residing in an ACCESS LEVELS column; however, in general, each ACCESS_LEVEL column value will store a single access level, and multiple access levels for a given user will be defined by respective rows corresponding to that user's user ID, in accordance with conventional database techniques.

In addition to the aforementioned columns, the user-access table may include a PIN/PASSWORD column and/or a UID (user ID) column. In one embodiment, each user's PIN or password would be stored the PIN/PASSWORD column or in another table that includes usernames and PINs/passwords. The idea here is that user authentication information would be stored via these columns. Optionally, a user may be authenticated by a single piece of information, such as a username, or PIN/password.

The UID columns in user-access table 310 and access level table 320 respectively serve as a primary key and foreign key columns that are used for linking the two tables together. In this manner, access level table 320 may serve as a reverse-lookup table in which users are identified for each access level in a manner similar to the access-level definitions discussed above with reference to FIG. 7.

Figure 10:
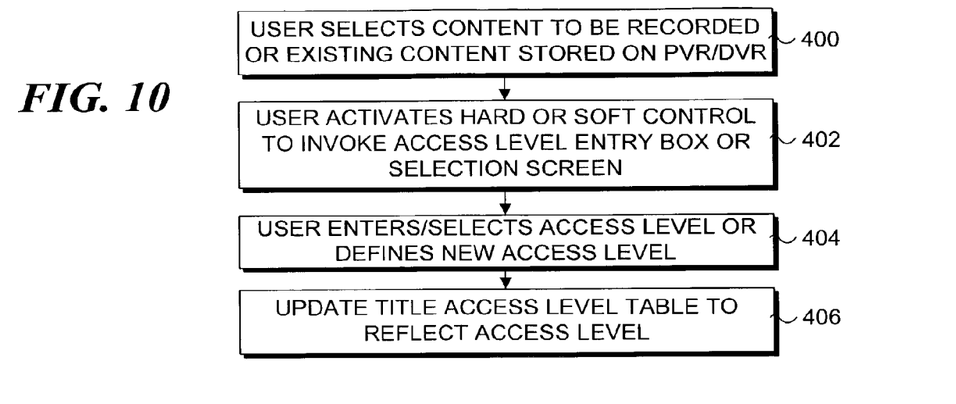
FIG. 10 is a flowchart illustrating operations performed when a user specifies an access level in accordance with one embodiment of the invention.
Figure 11:
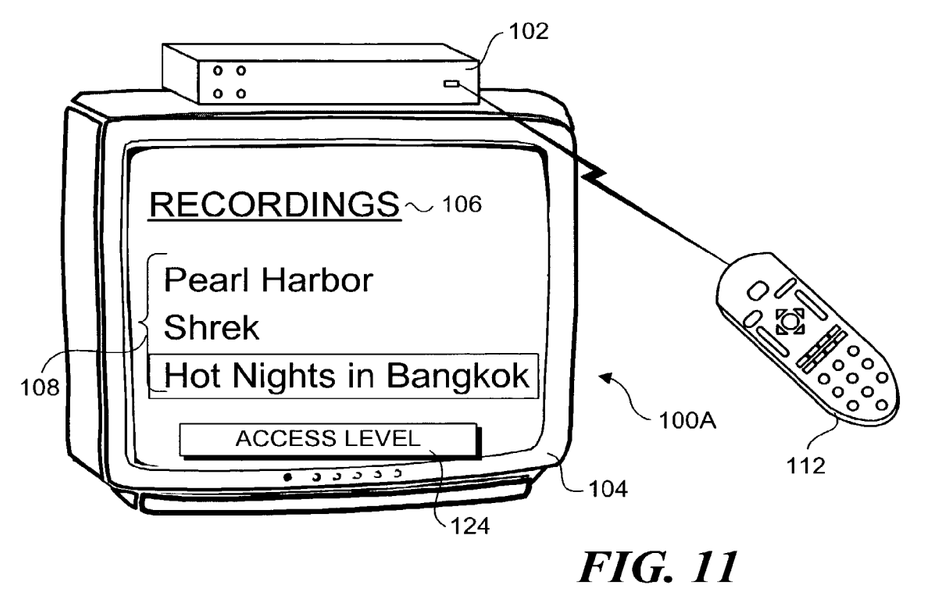
FIG. 11 is a representation of a screen from which an access-level definition screen may be invoked.

Once the access-level definitions have been entered, a user with appropriate privileges may define an access level for content that is already recorded or to be recorded in the following manner. As before, the user selects content to be recorded or existing content stored on the PVR or DVR in a block 400. The user then activates a hard or soft control to invoke an access-level selections screen. For example, as shown in FIG. 11, upon selecting Hot Nights in Bangkok, an "ACCESS LEVEL" soft button 100 may be displayed in a window 100A. Optionally, the access-level selection screen may be invoked via a hard or soft button on remote control 112.

Figure 12:
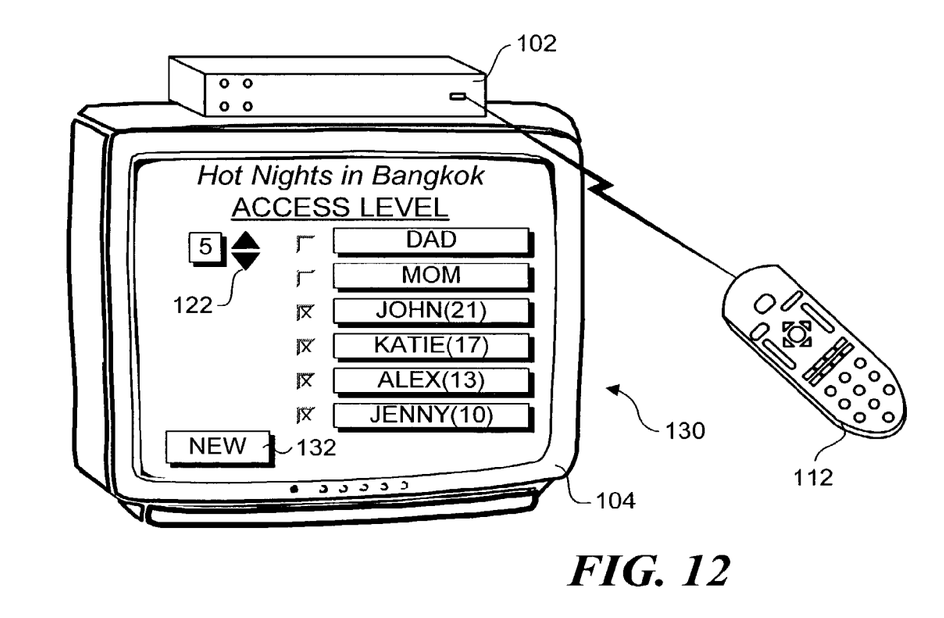
FIG. 12 is a representation of an access level definition screen that enables a user to define an access level for a selected title in accordance with one embodiment of the invention.

An exemplary access-level selection screen 130 is shown in FIG. 12. In this embodiment, the user is enabled to select the access level via up/down toggles 122. In one embodiment, the access-level selection screen may identify allowed and/or blocked users corresponding to the selected access level, such as illustrated in FIG. 12. Optionally, a screen or entry box may be provided to enable a user to enter a password. These operations are depicted by a block 404.

In some cases, the user may wish to apply an access-level condition that isn't among any existing access-level definitions. For example, in the illustrated embodiment an administrator (DAD) may wish to block access to all users except himself, an access-level definition that wasn't previously defined. In this case the user may select a "NEW" button 132 to cause a screen similar to screen 120 of FIG. 7 to be displayed, whereby the user could define a new access level.

Figure 13:
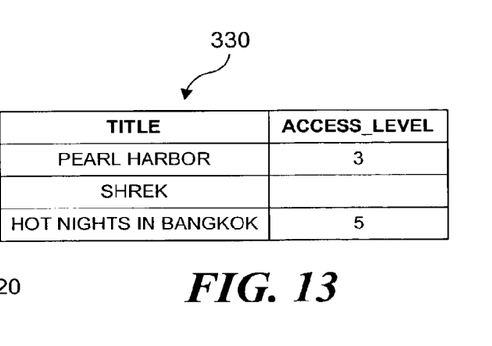
FIG. 13 shows an exemplary table in which title and access level information may be stored.

Once the access level for the content has been entered/selected/defined, corresponding information is updated in the system's database. For example, a title access level table 330 including TITLE and ACCESS_LEVEL columns may be updated to reflect the access level assigned to the title, as shown in FIG. 13. This completes the access-level assignment process for the title.

Figure 14:
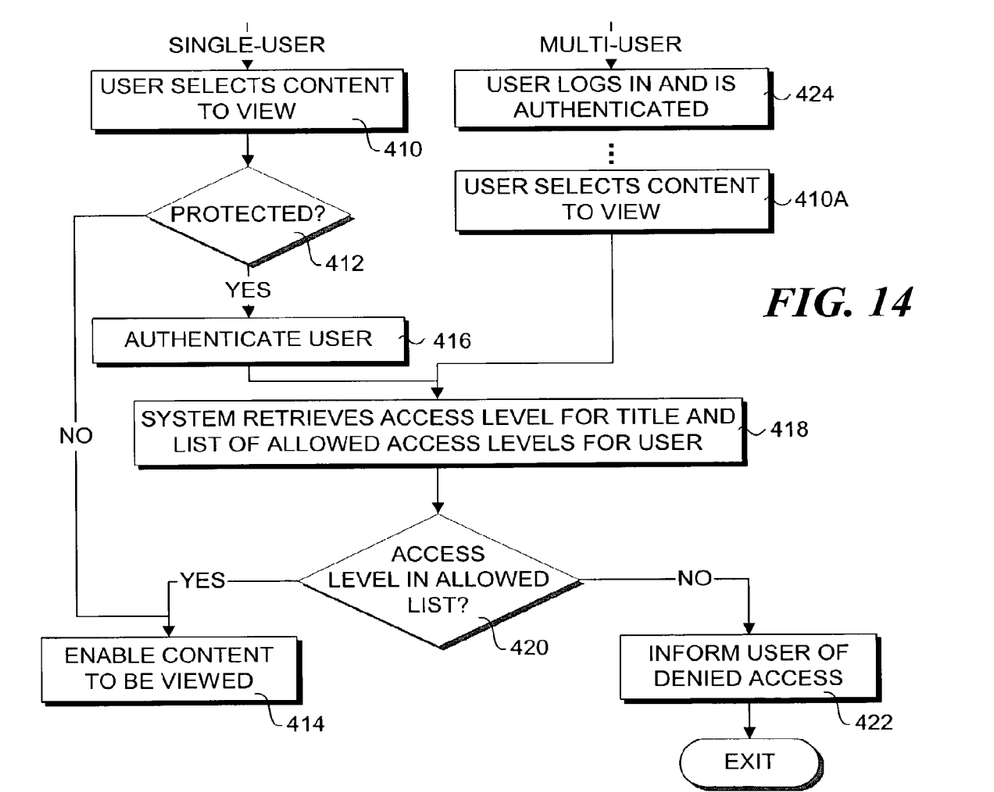
FIG. 14 is a flowchart illustrating logic and operations performed when a user attempts to access content under the access-level protection scheme in accordance with one embodiment of the invention.

The procedure for accessing a title for which an access level has been defined proceeds as follows, with reference to the flowchart of FIG. 14. In general, the system will be either a single-user or multi-user system. As defined herein, a single-user system is a system that does not provide individual content storage for individual users or otherwise does not provide unique functions for individual users. In contrast, a multi-user system supports individual storage or access functionality.

In accordance with a single-user system, the process begins in a block 410 in which a user selects content to view. In a decision block 412 a determination is made to whether the content is protected. In one embodiment, the title access level table will be scanned to verify whether an access level has been assigned to the title. If the answer is NO, the logic proceeds to a block 414 in which the user is enabled to view the content. If an access level has been defined, the answer to decision block 412 will be YES, and the logic will proceed to a block 416 in which the user will be authenticated. In general, this may comprise a combination of a username and PIN/password, or may simple be a unique user identifier, dependent on the particular scheme used for the system. If the user cannot be authenticated, the process will exit without letting the user access the content (not shown).

After the user has been authenticated, the system will retrieve the access level for the title from title access level table 330 and the list of allowed access levels for the user from user-access table 310 and/or access level table 320, as depicted by a block 418. In a decision block 420 a determination is made to whether the access level for the title is in the user's allowed access level list. If the allowed access levels for the user do not include the access level assigned to the title, the answer to decision block will be NO, and the logic will proceed to a block 422 in which the user is informed (e.g., via a warning box or the like displayed on the TV screen) (not shown) that he or she is denied access to the content. If the user's allowed access levels include the assigned access level, the answer to decision block 420 is YES< and the user is allowed to view the content.

The beginning of the process for a multi-user system is slightly different. In this case, as depicted by a block 424, the user will generally be authenticated at the start of the system during a login operation, which comprises an operation that is normally performed during initiation of a user session on a multi-user system. The user will then select content to view during the session in a block 410A. In response to this selection, the logic proceeds to block 418 and the rest of the operations are substantially similar to that described above for the single-user system. In this instance, the user's authentication information provided during the login operation will be used to identify the user.

In some cases, even though a movie is locked by a password or user-access level, a user may not want other users to even be aware of its existence in the movie directory on the PVR or DVR. If the title appears, a child of a certain age, for example, may be able to infer the subject of the movie from the title and from the description that may, in some cases, accompany the listing. Likewise, a user may wish to conceal a movie in the directory listing from, for example, their partner. Accordingly, what is furthermore clearly needed is a method by which a user not only can lock access to a movie in a directory listing with a password or the like, but also to change both the title and description of such as movie, for whatever reason the user may have, such as, for example, obscuring the nature and subject of the movie.

Figure 15:
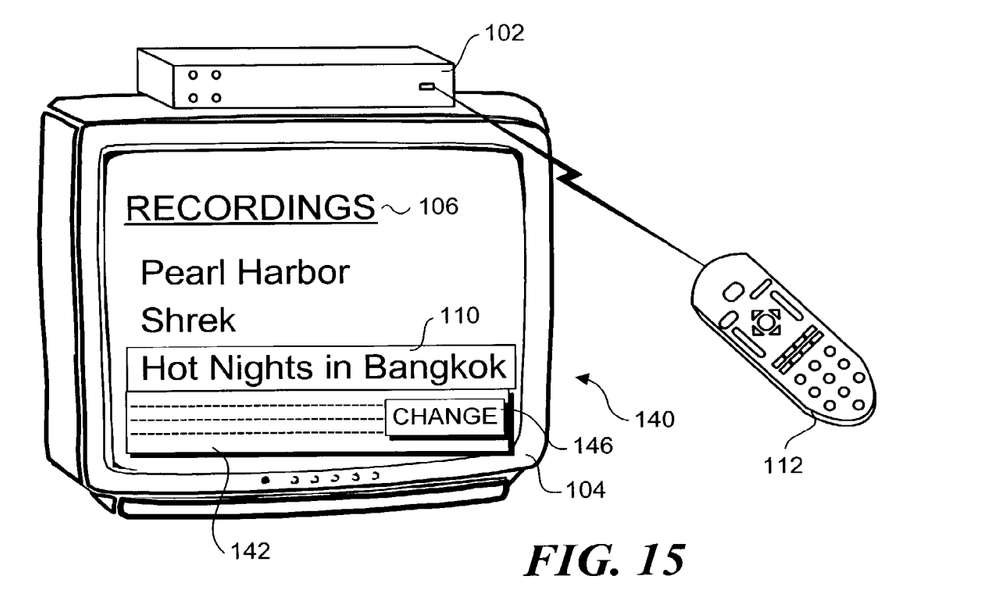
FIG. 15 is a representation of a screen that appears when a user selects a title to view or be recorded, wherein the screen includes description information pertaining to the selected title.
Figure 16:
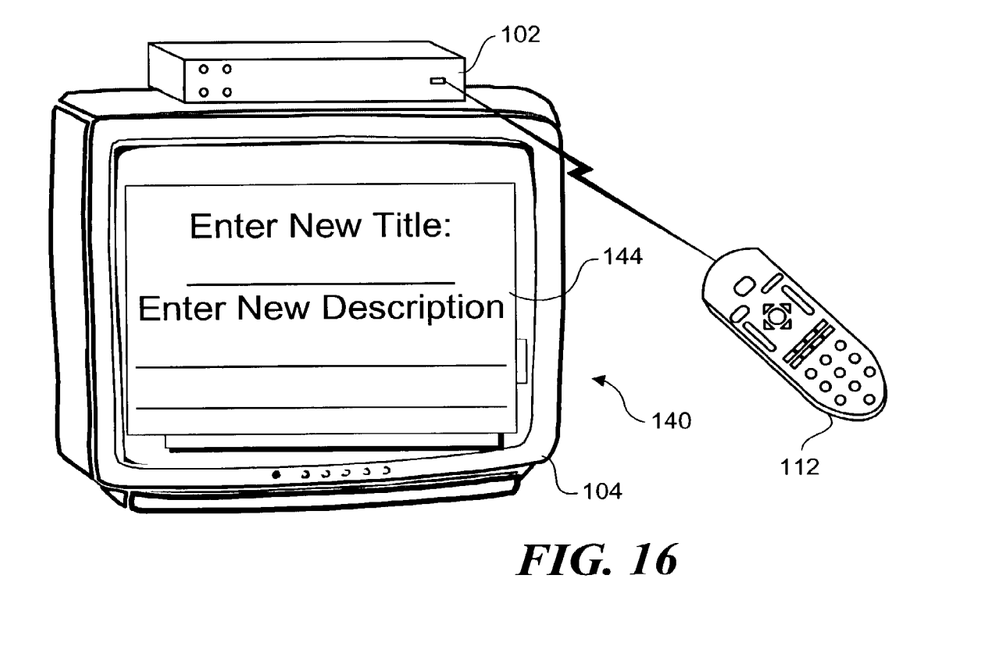
FIG. 16 is a representation of a screen that enables a user to enter a new title and description corresponding to a selected title.

FIG. 15 shows a window 140, wherein the movie Hot Nights in Bangkok is selected by selector 110, as described above. In response to selection of the movie, a content description box 142 is displayed, describing, e.g., the nature and subject of the movie. Suppose the user would like to change the title and/or the content. In one embodiment, the user is enabled to change this information through use of an edit dialog box 144, which may be invoked in a manner similar to that described above for adding a password. For example, edit dialog box 144 may be invoked using a hard or soft button on remote 112, or via a "CHANGE" button 146 displayed on window 140. Upon invoking edit dialog box 144, the user is enabled to enter a new title and description. In one embodiment, values for the title and description will initially be cleared. In another embodiment, the title and description values will initially be filled with the existing values.

Figure 17:
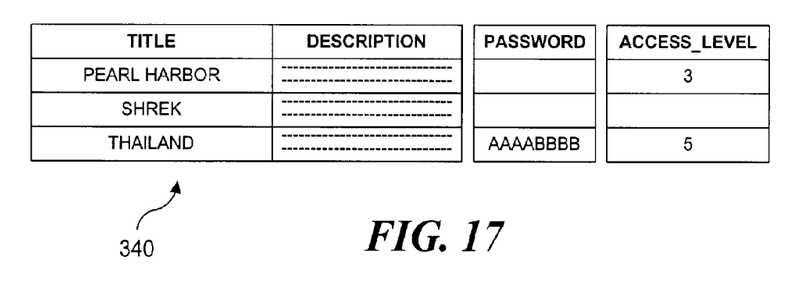
FIG. 17 shows an exemplary table in which title and description information may be stored.
Figure 18:
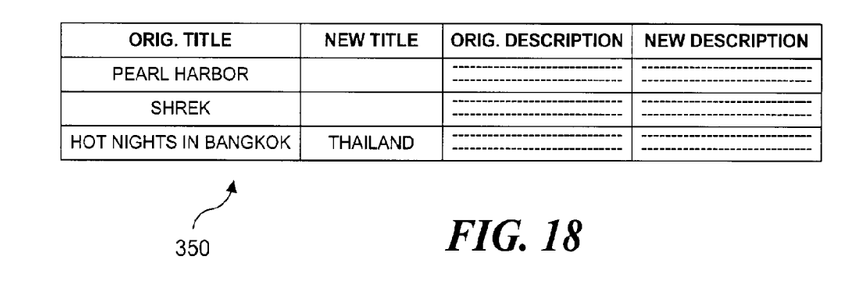
FIG. 18 shows an exemplary table in which original and new title and description information may be stored.

In response to saving the title and description values, corresponding data will be updated or written to the system's database. For example, suppose the title for Hot Nights in Bangkok is changed to Thailand. In one embodiment, a title-description table 340 is used to stored content title and description information, as shown in FIG. 17. This table may further include a PASSWORD column or an ACCESS_LEVEL column in which password or access level data are stored in a manner similar to tables discussed above that use these columns. In another embodiment, information pertaining to both the original title and description and new title and description are stored, as depicted by a title-description update table 350 shown in FIG. 18. As before, this table may also include PASSWORD and ACCESS_LEVEL columns. This table configuration is designed to support multi-user systems, wherein each user is identified during an initial authentication operation. Accordingly, the system will be able to identify a current user. When a password scheme is used, the owner of the password will be presented with the original title and original description when viewing the recordings directory. In contrast, when another user is viewing the recording directory, the new title and description will be shown. The access level scheme works in a similar manner, except in this instance the title and description displayed to the user will depend on whether the user is allowed to access content corresponding to the access level specified for the various titles in the recordings directory.

Figure 19:
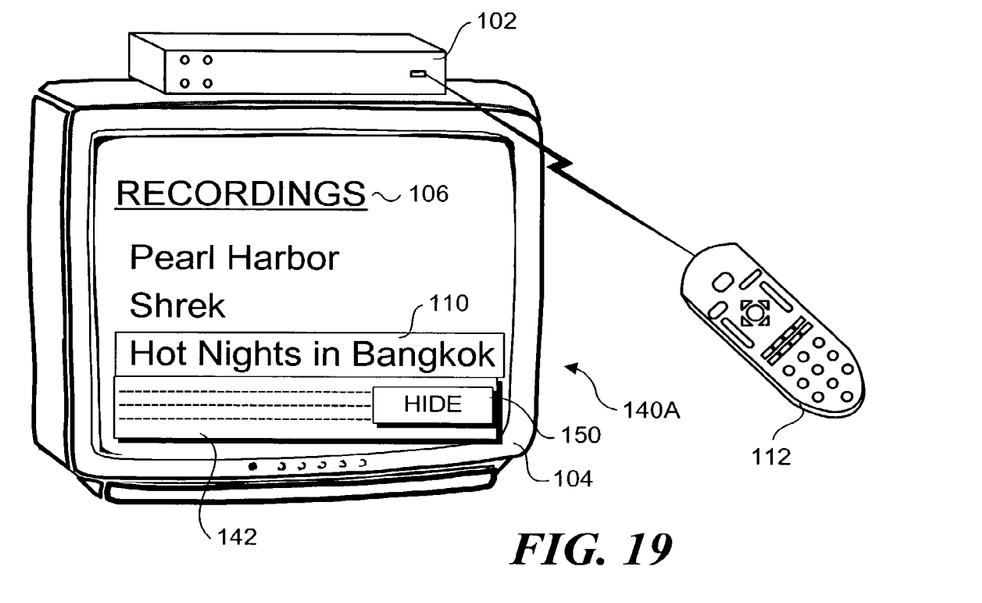
FIG. 19 is a representation of a screen from which a user may invoke a hide title and/or description operation.
Figure 20:
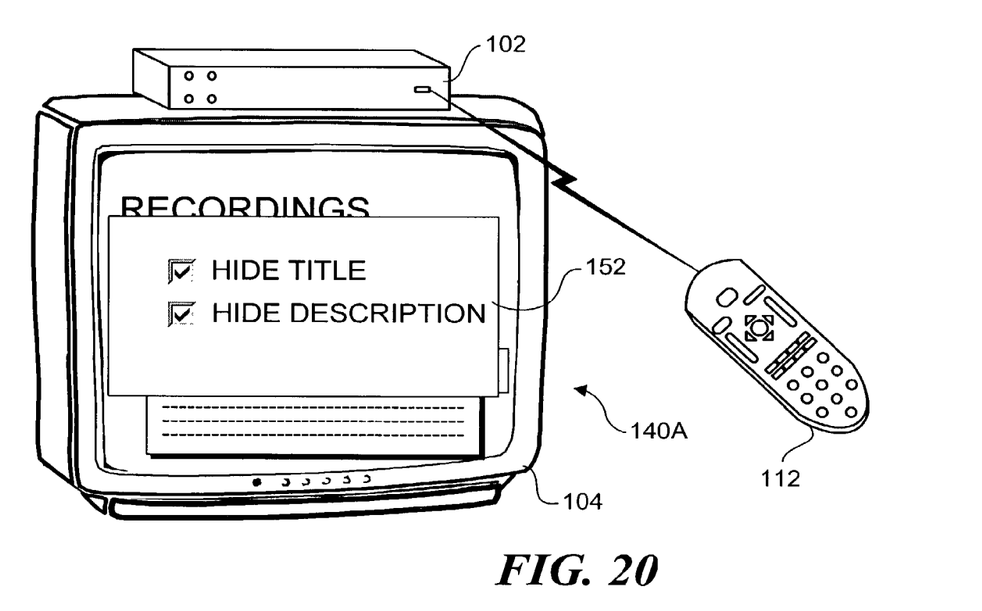
FIG. 20 is a representation of a screen that includes a dialog box by which a user may select to hide a title and/or description corresponding to a selected title.
Figure 21:
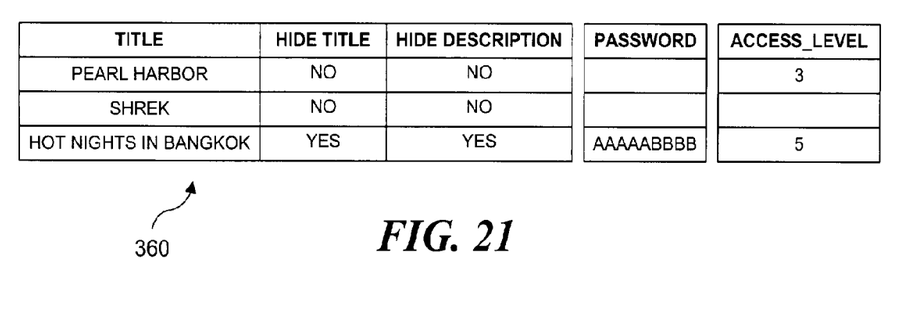
FIG. 21 shows an exemplary table in which title/description hide information may be stored.

In yet another embodiment, the title and descriptions of recorded content may be "hidden" from unauthorized users in a similar manner to renaming the same. For example, as shown in FIG. 19, the user may activate a "HIDE" button 150 to invoke a hide edit box 152 shown in FIG. 20. Optionally, a hard or soft button on remote control 112 may be used to invoke the hide edit box. The user could then select to hide the title and/or description for the selected content. Corresponding information would then be stored in a title-description hide table 360 shown in FIG. 21. Under this scheme, authorized users (based on password or access level) would be able to see the title and/or description in the recordings directory, while such information would not be displayed to unauthorized users.

In general, once a password has been assigned to a movie listed in the directory, a user may not modify the title or description without first entering the password. Similar conditions may be enforced for access level protection schemes (i.e., a user may not modify a title or description if the user's allowed access levels do not include the access level assigned to the content). In a further embodiment, a separate and additional password may be assigned to the functionality of the buttons that invokes edit dialog box 144 or hide edit box 152, thereby allowing an authorized user (for example, a parent) to prevent other users (for example, a child) from modifying titles and descriptions, while retaining the ability to modify them.

Exemplary Machine for Implement Embodiments of the Invention

A schematic block diagram illustrating various components and operations of an exemplary machine 500 for implementing the embodiments of the invention discussed above is shown in FIG. 22. Generally, machine 500 is representative of PVRs, DVRs, and similar "set-top" boxes that are used to record audio and digital content. Generally, machine 500 will include one or more processors 502 coupled to a bus 504. The machine will also generally include memory 506, storage 508, a display controller 510, an input/output controller 512 and an audio controller 514, each of which is also coupled to bus 504.

Figure 22:
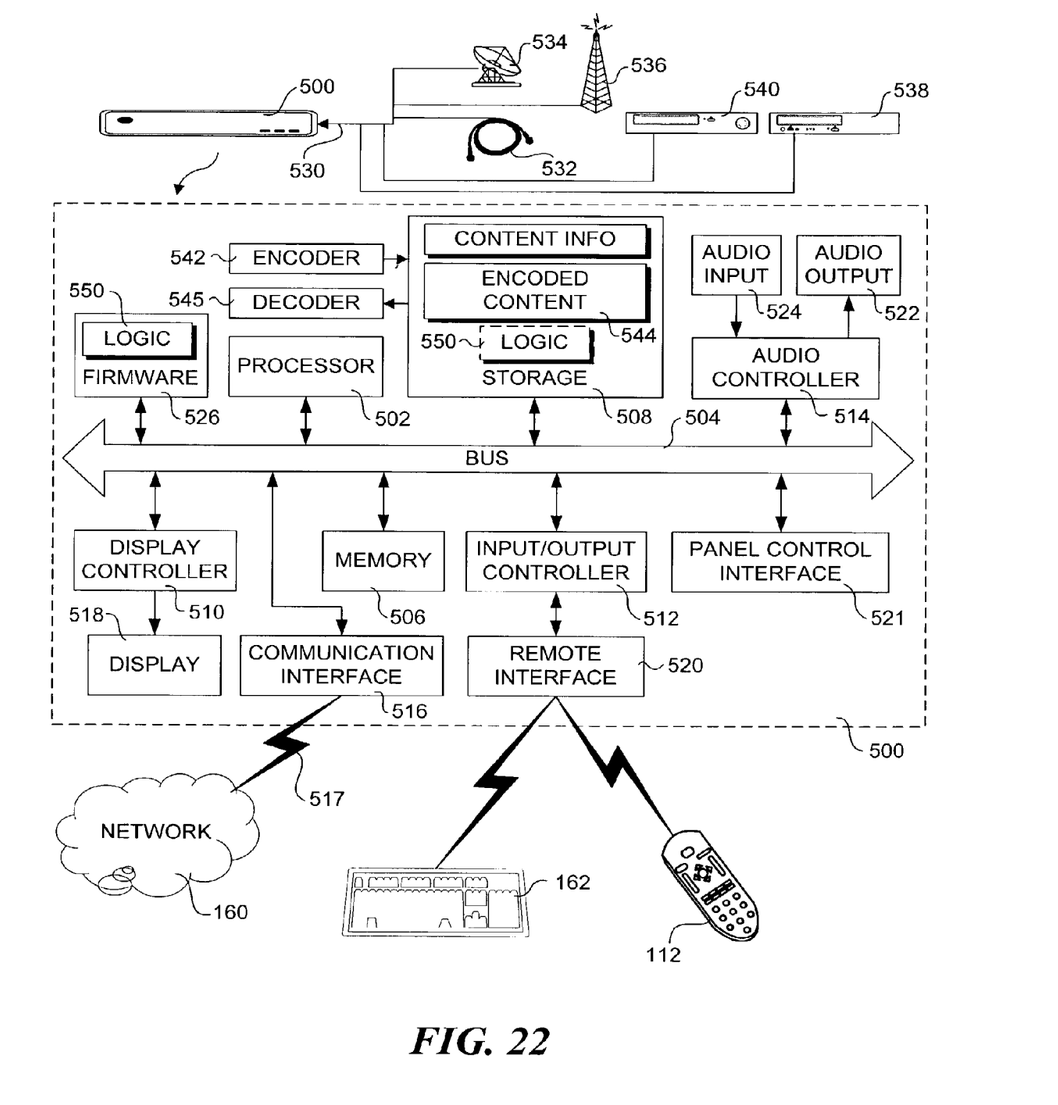
FIG. 22 is a schematic block diagram illustrating various components in a machine that may be used to implement the operations of various embodiments of the invention described herein.

In one embodiment, machine 500 interfaces to external systems through a communications interface 516. Communications interface 516 may include a radio transceiver compatible with AM, FM, TV, digital TV, DVB, wireless telephone signals or the like. Communications interface 516 may also include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

In one embodiment, a carrier wave signal 517 is received by communications interface 516 to communicate with a network 160. In one embodiment, carrier wave signal 517 is considered to be machine readable media, which may be transmitted through wires, cables, optical fibers or through the atmosphere, or the like.

In one embodiment, processor 502 may be a conventional microprocessor, such as for example but not limited to an Intel x86 or Pentium family microprocessor, a Motorola family microprocessor, or the like. Optionally, the processor may comprise a microcontroller, or the like. Memory 506 may be a machine-readable medium such as dynamic random access memory (DRAM) and may include static random access memory (SRAM). Display controller 510 controls in a conventional manner a display 518, which in one embodiment may be a cathode ray tube (CRT), a liquid crystal display (LCD), an active matrix display, a television monitor or the like. In one embodiment, a remote interface 520 is provided to support interaction with remote input devices, such as remote control 112 and a remote keyboard 162. Other remote input devices may also be used. Wired input devices may also be supported as well. A panel control interface 521 may also be provided to enable user input from a user input panel or the like provided by the machine.

In one embodiment, audio controller 514 controls in a conventional manner audio output 522, which may include, audio speakers, headphones, an audio receiver, amplifier or the like. In one embodiment, the audio controller also controls in a conventional manner audio input 524, which may include a microphone or input(s) from an audio or musical device, or the like.

Storage 508 in one embodiment may include machine-readable media such as, for example, but not limited to a magnetic hard disk, an optical disk, a read-only memory (ROM) component, a smart card or another form of storage for data. In one embodiment, storage 508 may include removable media, read-only media, readable/writeable media or the like. Some of the data may be written by a direct memory access process into memory 506 during execution of software in machine 500. It is appreciated that software may reside in storage 508, memory 506 or may be transmitted or received via modem or communications interface 516. Optionally, all or a portion of the software may be stored in a firmware storage device 526. For the purposes of this specification, the term "machine-readable media" shall be taken to include any media that is capable of storing data, information or encoding a sequence of instructions for execution by processor 502 to cause machine 500 to perform the operations of the embodiments of the invention discussed above. The term "machine-readable media" shall be taken to include, but is not limited to solid-state memories, optical and magnetic disks, carrier wave signals, and the like.

In general, machine 500 will be used to store content corresponding to movies, television shows, and the like. Typically, the content will be initially received as an audio/video (A/V) input signal 530. The A/V input signal may originate from one or more sources, including a cable broadcast 532, a satellite broadcast 534, or a local television broadcast 536. The A/V input signal may also be provided by a playback device, such as a DVD player 538 or VCR 540. It will be appreciated that other content input devices may be used as well, such as computers and the like.

Typically, upon receiving AN signal 530, the signal will either be used for storing content, and/or passed through for display purposes. In cases in which the content is to be stored, the A/V signal will usually be encoded by an encoder 542 and stored as encoded content 544 in storage 508. A decoder 545 is used to decode the encoded content during playback operations. The encoding and decoding operations may be provided by embedded components (e.g., MPEG encoders and decoders), by processor 502, or a combination of the two. In addition to storing encoded content, storage 508 may be used to store corresponding content information 546, such as recording directories and the like. Content information 546 is used to also represent the various control access-related tables described herein (i.e., the system database).

In general, the operations of the embodiments described above will be implemented by executing software code stored in one or more software modules. Collectively, this software code is represented as logic 550. As shown, logic 550 may be stored in firmware device 526 and/or storage 508. Logic 550 also represents common PRV/DVR applications, such as recording applications and electronic program guides and the like. In some instances, logic 550 may be updated via a download. Accordingly, in one embodiment firmware device 526 comprises a rewriteable component, such as flash memory.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    at least one processor; and
    memory storing computer-readable instructions that, when executed by the at least one processor, cause the apparatus to:
    receive login information corresponding to one of a plurality of user identifications, each of the user identifications being associated with one of a plurality of access levels;
    generate a first user interface configured to display at least one title corresponding to at least one piece of recorded content, wherein content of the at least one title displayed is based on an access level associated with the one of the plurality of user identifications; and generate a second user interface configured to receive a modified title and a modified description for the at least one piece of recorded content from a user having administrative rights, wherein an original title and an original description of the at least one piece of recorded content are displayed to a first user having a first access level, wherein the modified title and the modified description are displayed to a second user having a second access level, and wherein the original title and description and the modified title and description are hidden from a third user having a third access level.

2. The apparatus of claim 1, wherein the received login information corresponds to a first user identification having the first access level.

3. The apparatus of claim 2, wherein the content of the at least one title displayed is the original title of the at least one piece of recorded content.

4. The apparatus of claim 1, wherein the received login information corresponds to a second user identification having the second access level.

5. The apparatus of claim 4, wherein the content of the at least one title displayed is the modified title of the at least one piece of recorded content.

6. The apparatus of claim 1, wherein the received login information corresponds to a third user identification having the third access level.

7. The apparatus of claim 6, wherein a first title is hidden from the third user.

8. The apparatus of claim 7, wherein the first title is hidden from the third user based on receiving a request to hide the first title from one or more users associated with the third access level.

9. The apparatus of claim 8, wherein the request to hide the first title is received from the user having the administrative rights.

10. A method, comprising:
receiving, at a set-top box, login information corresponding to one of a plurality of user identifications, each of the user identifications being associated with one of a plurality of access levels;
generating, by the set-top box, a first user interface configured to display at least one title corresponding to at least one piece of recorded content, wherein content of the at least one title displayed is based on an access level associated with the one of the plurality of user identifications; and
generating, by the set-top box, a second user interface configured to receive a modified title and a modified description for the at least one piece of recorded content from a user having administrative rights,
wherein an original title and an original description of the at least one piece of recorded content are displayed to a first user having a first access level, wherein the modified title and the modified description are displayed to a second user having a second access level, and wherein the original title and description and the modified title and description are hidden from a third user having a third access level.

11. The method of claim 10, wherein the received login information corresponds to a first user identification having the first access level.

12. The method of claim 11, wherein the first access level allows a user to view the original title of the at least one piece of recorded content.

13. The method of claim 12, wherein the first access level allows the user to modify the original title of the at least one piece of recorded content.

14. At least one non-transitory computer-readable medium having computer-executable instructions stored thereon that, when executed, cause at least one computing device to:
receive login information corresponding to one of a plurality of user identifications, each of the user identifications being associated with one of a plurality of access levels;
generate a first user interface configured to display at least one title corresponding to at least one piece of recorded content, wherein content of the at least one title displayed is based on an access level associated with the one of the plurality of user identifications; and
generate a second user interface configured to receive a modified title and a modified description for the at least one piece of recorded content from a user having administrative rights,
wherein an original title and an original description of the at least one piece of recorded content are displayed to a first user having a first access level, wherein the modified title and the modified description are displayed to a second user having a second access level, and wherein the original title and description and the modified title and description are hidden from a third user having a third access level.

15. The at least one non-transitory computer-readable medium of claim 14, wherein the modified title is received from the first user.

16. The at least one non-transitory computer-readable medium of claim 14, wherein the original title and the modified title are hidden from the third user based on receiving a request to hide the original title and the modified title from one or more users associated with the third access level.

17. The at least one non-transitory computer-readable medium of claim 16, wherein the request to hide the original title and the modified title is received from the user having the administrative rights.

18. The method of claim 10, wherein the modified title is a renamed title for the at least one piece of recorded content.

19. The method of claim 10, wherein the at least one title corresponds to at least one piece of recorded video content.

* * * * *